United States Patent
Stubbs (10) Patent No.: US 9,528,456 B2
(45) Date of Patent: Dec. 27, 2016

(54) FAULT DETECTION AND CORRECTION IN VALVE ASSEMBLIES

(71) Applicant: PERKINS ENGINES COMPANY LIMITED, Cambridgeshire (GB)

(72) Inventor: Adam Stubbs, Cambridgeshire (GB)

(73) Assignee: Perkins Engines Company Limited, Peterborough (GB)

(*) Notice: Subject to any disclaimer, the term of this patent is extended or adjusted under 35 U.S.C. 154(b) by 366 days.

(21) Appl. No.: 14/362,699

(22) PCT Filed: Dec. 11, 2012

(86) PCT No.: PCT/GB2012/053087
§ 371 (c)(1),
(2) Date: Jun. 4, 2014

(87) PCT Pub. No.: WO2013/093421
PCT Pub. Date: Jun. 27, 2013

(65) Prior Publication Data
US 2014/0332705 A1    Nov. 13, 2014

(30) Foreign Application Priority Data
Dec. 23, 2011 (GB) .................................. 1122321.1

(51) Int. Cl.
*F02M 25/07* (2006.01)
*F02D 41/00* (2006.01)
(Continued)

(52) U.S. Cl.
CPC ......... *F02D 41/0077* (2013.01); *F02D 41/221* (2013.01); *F02M 26/48* (2016.02); *F16K 31/04* (2013.01); *Y02T 10/47* (2013.01)

(58) Field of Classification Search
CPC .............. F02M 25/071; F02M 25/0772; F02M 25/0773
(Continued)

(56) References Cited

U.S. PATENT DOCUMENTS

| 4,974,622 A | 12/1990 | Radar |
| 5,855,195 A | 1/1999 | Oikawa et al. |

(Continued)

FOREIGN PATENT DOCUMENTS

| DE | 19806996 | 9/1998 |
| DE | 198 45 525 A1 | 4/2000 |

(Continued)

OTHER PUBLICATIONS

English-language International Search Report from European Patent Office for International Application No. PCT/GB2012/053087, mailed Mar. 27, 2013 (2 pages).

*Primary Examiner* — John Kwon (57) ABSTRACT

A method of controlling a valve assembly includes calculating, by a controller of the valve assembly, one or more electrical signals to move a valve element of the valve assembly dependent on an actual and a desired position of the valve element. The method also includes sending, by the controller, the one or more electrical signals to an electrical actuator of the valve assembly. The method further includes detecting a valve fault condition defined as the actual position of the valve element failing to match the desired position of the valve element after a configurable period has elapsed. When the valve fault condition is detected, the method includes substituting the data corresponding to the desired position of the valve element with pulses of waveform data which oscillate about a value corresponding to the desired position of the valve element until either of two predetermined conditions is met.

20 Claims, 4 Drawing Sheets (51) Int. Cl.
*F02D 41/22* (2006.01)
*F16K 31/04* (2006.01)

(58) Field of Classification Search
USPC ..... 123/568.21, 568.23, 568.24; 251/129.04,
251/129.11; 137/554
See application file for complete search history.

(56) References Cited

U.S. PATENT DOCUMENTS

| | | | |
|---|---|---|---|
| 5,873,345 A * | 2/1999 | Hirooka | F02D 31/003 123/327 |
| 5,950,597 A | 9/1999 | Kamio et al. | |
| 6,889,121 B1 | 5/2005 | Shahroudi et al. | |
| 7,426,829 B2 * | 9/2008 | Greentree | F02B 37/24 290/52 |
| 7,765,966 B2 * | 8/2010 | Leone | B60K 6/24 123/90.15 |
| 2004/0031455 A1 * | 2/2004 | Muraji | F01L 9/04 123/90.15 |
| 2013/0008417 A1 * | 1/2013 | Sankar | F02D 41/0047 123/568.12 |

FOREIGN PATENT DOCUMENTS

| | | |
|---|---|---|
| DE | 103 54 470 A1 | 6/2005 |
| EP | 1405998 | 4/2004 |
| EP | 1 424 476 A1 | 6/2004 |
| EP | 1 467 076 A2 | 10/2004 |

* cited by examiner

FAULT DETECTION AND CORRECTION IN VALVE ASSEMBLIES

CLAIM FOR PRIORITY

This application is a U.S. national phase entry under 35 U.S.C. 371 from PCT International Application No. PCT/GB2012/053087, filed Dec. 11, 2012, which claims benefit of priority of UK Patent Application No. 1122321.1 filed Dec. 23, 2011, the subject matter of both of which is incorporated herein by reference.

TECHNICAL FIELD

Controller and method for operation of a valve assembly.

BACKGROUND

Electrically actuated valves are known for a variety of applications, including in the automotive field. For example, in an engine, an electrically actuated valve may be used to control the recirculation of exhaust gases back to the engine cylinders in an exhaust gas recirculation (EGR) system.

An electrically actuated valve comprises a valve element which is movable between a first end in which the valve is fully open and a second end, opposite the first end, in which the valve is fully closed. The position of the valve element between the first end and the second end establishes the extent to which the valve is open. The valve may include a mechanical stop at the first end to prevent the valve element from moving beyond the first end and a mechanical stop at the second end to prevent the valve element from moving beyond the second end.

Applying an electrical signal of a first polarity to the electrically actuated valve may cause the valve element to move in a first direction, i.e. towards the first end, and applying an electrical signal of a second polarity, opposite to the first polarity, to the electrically actuated valve may cause the valve element to move in a second direction opposite to the first direction, i.e. towards the second end.

In certain conditions, valves and their associated control systems may behave unexpectedly. For example, in response to the application of an electrical signal to the electrically actuated valve, the valve element may move generally more slowly than is expected (which might be described as a "sluggish" valve) or it might favour moving from some positions over other positions (which might be described as a "sticky" valve) or it might fail to move altogether (a "stuck" valve). All of these might be described as valve faults.

Against this background there is provided a method and control system for detecting such valve faults and applying a valve control strategy which seeks to remedy such faults.

SUMMARY OF THE DISCLOSURE

In one embodiment of the disclosure there is provided a method of controlling a valve assembly, the valve assembly comprising:
  a valve element movable between an open stop and a closed stop wherein a position of the valve element between the open stop and the closed stop establishes an extent to which the valve is open;
  an electrical actuator for moving the valve element in response to an electrical signal;
  a position sensor for detecting an actual position of the valve element;
  a controller configured to receive data corresponding to a desired position of the valve element and to supply a calculated electrical signal to the electrical actuator in order to effect movement of the valve element from the actual position of the valve element to the desired position of the valve element;
the method comprising the steps of:
using the controller to calculate and send electrical signals to the electrical actuator in order to move the valve element dependent on the actual and desired positions of the valve element;
detecting a valve fault condition defined as the actual position of the valve element failing to match the desired position of the valve element after a configurable period has elapsed; and in the event of detecting the valve fault condition:
substituting the data corresponding to the desired position of the valve element with pulses of waveform data which oscillate about a value corresponding to the desired position of the valve element until either:
  (a) the actual position of the valve element matches the desired position of the valve element to within an allowable valve position margin; or
  (b) a preconfigured number of pulses has been reached.

Advantageously, the method provides a technique not only for detecting such valve faults but also which seeks to overcome such valve faults. Moreover, the method is implementable using the control system which controls the valve in normal operation. The solution may be implemented using existing or standard control apparatus. Furthermore, the solution minimises disruption to the standard control criteria used to control the valve.

In a further embodiment of the disclosure there is provided a controller for controlling operation of a valve assembly, the valve assembly comprising:
  a valve element movable between an open stop and a closed stop wherein a position of the valve element between the open stop and the closed stop establishes an extent to which the valve is open;
  an electrical actuator for moving the valve element in response to an electrical signal; and
  a position sensor for detecting an actual position of the valve element;
  the controller configured:
  (A) to receive data corresponding to a desired position of the valve element and to supply a calculated electrical signal to the electrical actuator in order to effect movement of the valve element from the actual position of the valve element to the desired position of the valve element;
  (B) to detect a valve fault condition defined as the actual position of the valve element failing to match the desired position of the valve element after a configurable period has elapsed; and
  (C) in the event of detecting the valve fault condition to substitute the data corresponding to the desired position of the valve element with pulses of waveform data which oscillate about a value corresponding to the desired position of the valve element until either:
  (a) the actual position of the valve element matches the desired position of the valve element to within an allowable valve position margin; or
  (b) a preconfigured number of pulses has been reached.

An embodiment of the disclosure will now be disclosed, by way of example only, with reference to the accompanying drawings in which:

DETAILED DESCRIPTION

Figure 1:
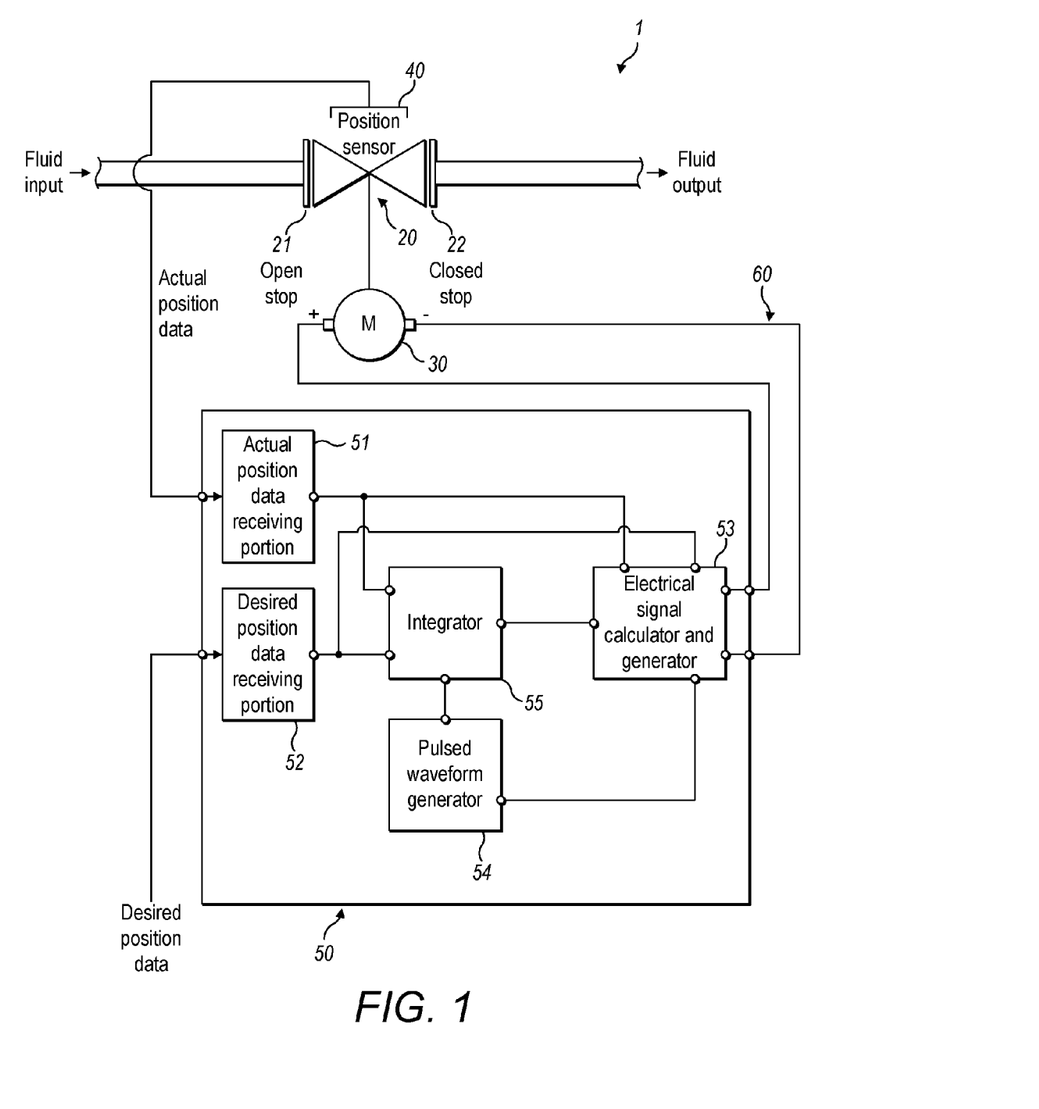
FIG. 1 is a schematic diagram showing the features of the controller of the present disclosure in the context of a valve actuated by a DC motor.

Referring to FIG. 1 there is illustrated a valve assembly 1 comprising a valve element 20, a DC motor 30, a position sensor 40 and a controller 50. The valve element 20 may be movable between an open stop 21 and a closed stop 22. The valve is fully open when the valve element 20 is located at the open stop 21 and the valve is fully closed when the valve element 20 is located at the closed stop 22. The valve element 20 may be positioned between the open stop 21 and the closed stop 22 such that the valve is neither fully open nor fully closed. Where the valve element 20 is neither in the fully open nor in the fully closed position, the position of the valve element 20 relative to the open and closed stops 21, 22 dictates the extent to which the valve is open. The position of the valve element 20 may be sensed by one or more position sensors 40.

The DC motor 30 is arranged to receive an electrical signal (i.e. a current) in order to cause the DC motor 30 to rotate. An electrical signal of a first polarity causes the DC motor 30 to rotate in a first direction while an electrical signal of a second polarity causes the DC motor 30 to rotate in a second direction, opposite to the first direction. Rotational movement of the DC motor 30 may be used to actuate movement of the valve element 20. Rotational movement of the DC motor 30 in a first direction may be used to actuate movement of the valve element 20 in a third direction, i.e. towards the open stop 21, while rotational movement of the DC motor 30 in a second direction, opposite to the first direction, may be used to actuate movement of the valve element 20 in a fourth direction, opposite to the third direction, i.e. towards the closed stop 22. By this method, the valve element 20 may be finely positioned to a variety of locations between the open and closed stops 21, 22.

The controller 50 may receive data relating to the desired position of the valve element 20 and may also receive data from the position sensor 40 relating to the actual position of the valve element 20. The controller 50 may then calculate the distance to be moved by the valve element 20 in order to move from the actual position to the desired position. Having calculated this distance, the controller 50 may further calculate the electrical signal necessary to be input to the DC motor 30 in order to effect rotation thereof so as to cause movement of the valve element 20 from the actual position to the desired position. The electrical signal calculated by the controller 50 (the controller output current 62) may then be input to the DC motor 30 as the DC motor input signal 60.

In some embodiments the valve element 20 may be biased towards one of the stops 21, 22 by a spring or other means. For example, it may be sprung biased towards the closed stop 22. In an embodiment having the valve element 20 biased towards the closed stop 22, the valve element 20 may move towards the closed stop 22 when no electrical signal is applied to the DC motor 30. Similarly, in an embodiment having the valve element 20 biased towards the open stop 21, the valve element 20 may move towards the open stop 21 when no electrical signal is applied to the DC motor 30.

In embodiments where the valve element 20 is biased towards one of the stops 21, 22, when calculating the electrical signal necessary to move the valve element 20 against the bias, the controller 50 may take account of the energy needed to overcome the bias.

The controller 50 may comprise: an actual position data receiving portion 51; a desired position data receiving portion 52; an electrical signal calculator and generator 53; a pulsed waveform generator 54; and an integrator 55.

The actual position data is output from the actual position data receiving portion 51 and the desired position data is output from the desired position data receiving portion 52. The actual position data and the desired position data are input to the following elements of the controller: the electrical signal calculator and generator 53; and the integrator 55.

The integrator 55 calculates an integral of the error between the actual position data and the desired position data since the error was last zero. The integrator 55 makes use of an integral threshold value which may be pre-programmed, calculated, accessible from a look-up table or otherwise provided. The integral threshold value may be constant or may vary depending on one or more parameters. If the integrator 55 determines that the integral is below the integral threshold value then this may indicate "no fault" and if the integrator 55 determines that the integral value is above the integral threshold value then this may indicate a "fault".

Where the output of the integrator 55 indicates "no fault", the desired position data and the actual position data may pass directly to the electrical signal calculator and generator 53 which calculates the electrical signal 60 necessary to send to the DC motor 30 in order to effect movement of the valve element from the actual to the desired position.

Where the output of the integrator 55 indicates a "fault", this triggers the pulsed waveform generator to supply a pulsed waveform to be superimposed over the desired position data. Consequently, the electrical signal calculator and generator 53 calculates and generates an electrical signal 60 to pass to the DC motor 30 on the basis of a pulsed desired position of the valve element rather than a constant desired position of the valve element. As a result, the output of the electrical signal calculator and generator 53 is such as to cause the magnitude of the electrical signal to increase. Where the electrical signal is a current, for example, the magnitude of the current increases. This results in the maximum force being applied to the valve element via the DC motor. Maximum force is more likely to overcome valve sluggishness or stickiness.

The amplitude and frequency of the waveform pulses may change with each pulse. Instead or in addition, the frequency of the waveform data may change for each pulse.

For example, the amplitude of the waveform data may increase with each pulse. The frequency of each pulse of the waveform may vary with each pulse, as illustrated by lines 1 and 4 in FIG. 2a and FIG. 2b (wherein, in those examples, the pulsed waveform is a square waveform).

Superimposing the pulsed waveform data over the desired position data may be stopped when either one (or both) of the following two criteria is met.

The first criterion may be when the integral calculated by the integrator 55 reduces to below the integral threshold value so as to indicate that the actual position of the valve is sufficiently close to the desired position of the valve. In other words, the fault is overcome by the pulsed waveform and the valve returns to its expected operation.

The second criterion may be when a preconfigured number of waveform pulses has been applied and the output of the integrator 55 continues to exceed the integral threshold value. In this case, the control system 50 may provide a warning to the user that the valve is not behaving as expected and/or that the control system 50 has so far failed to overcome this problem by the pulsed waveform superposition technique disclosed herein.

Figure 2A:
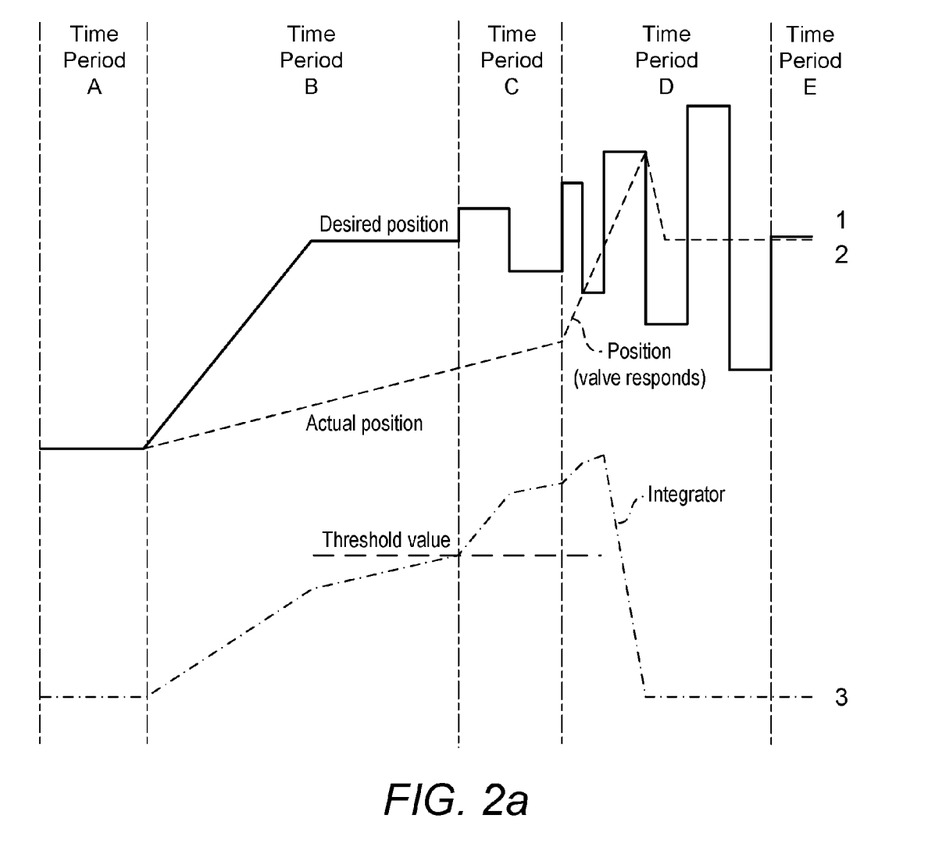
FIG. 2a is a graph showing differences between "desired" and "actual" positions of a valve element together with a square waveform superimposed over the desired position in response to a fault having been detected, wherein the fault correction is successful.
Figure 2B:
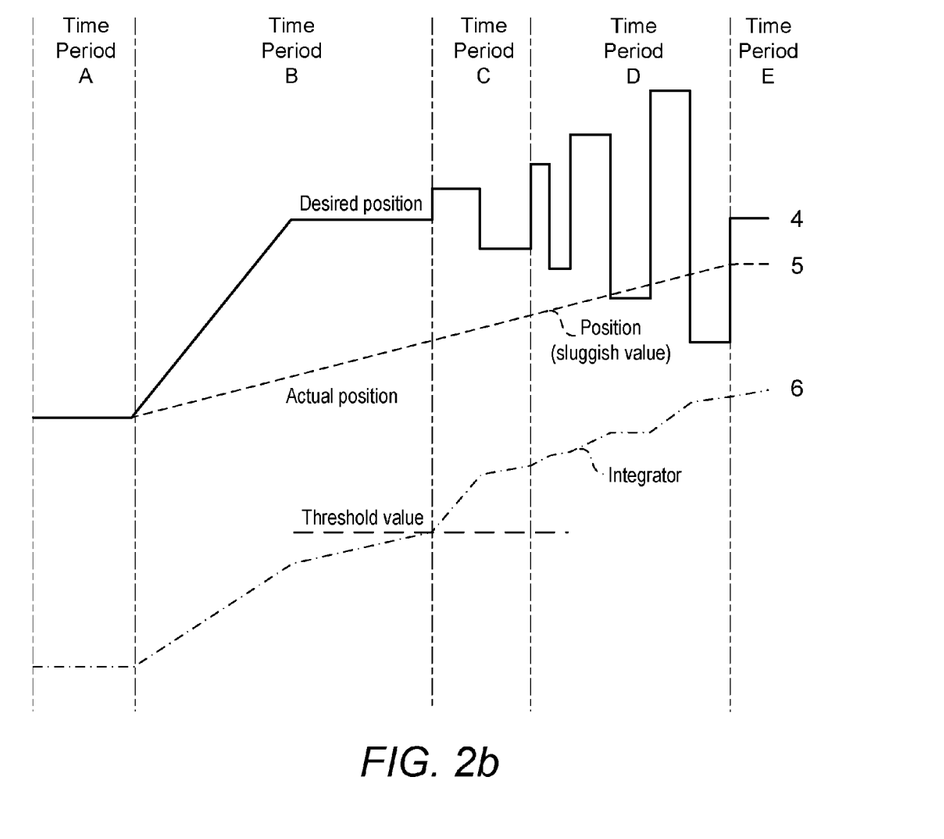
FIG. 2b is a graph showing differences between "desired" and "actual" positions of a valve element together with a square waveform superimposed over the desired position in response to a fault having been detected, wherein the fault correction is not successful.

Referring to FIG. 2a and FIG. 2b, there are illustrated, in a schematic form, examples of controller inputs, intermediate values and outputs against time. In these examples, the pulsed waveform is a square pulsed waveform.

Lines 1 to 3 (FIG. 2a) show the situation where use of the technique herein disclosed causes the valve fault to be both detected and corrected (first criterion).

Lines 4 to 6 (FIG. 2b) show the situation where use of the technique herein disclosed causes the valve error to be corrected but wherein correction of the fault is not successful (second criterion).

For the first criterion example (FIG. 2a), the desired position of the valve element is represented as line 1, the actual position of the valve element is represented as line 2 and the value of the integrator is represented as line 3.

In time period A, lines 1 and 2 indicate that the desired and actual positions are consistent. As such, the integrator produces a zero value which is below the integral threshold value. However, in time period B the actual position of the valve element (line 2) moves more slowly than the desired position of the valve element (line 1). (In other words, the gradient of line 1 which represents the desired position of the valve element is greater than the gradient of line 2 which represents the actual position of the valve element.)

The integral calculated by the integrator 55 (line 3) reaches the integral threshold value at the start of time period C. As such, a fault is noted and the desired position data which is input to the electrical signal calculator and generator 53 has a square waveform superimposed upon it, as illustrated by line 1 in time period C. At the start of time period D, the valve begins to respond more rapidly. Part way through time period D, the actual position conforms to the actual desired position (which is the average position of the square waveform). At this point, the integral calculated by the integrator 55 (line 3) falls to below the threshold value and the electrical signal calculator and generator 53 returns to using as its input the desired position data without the square waveform superimposed upon it. In other words, normal operation resumes.

For the second criterion example (FIG. 2b), the desired position of the valve element is represented as line 4, the actual position of the valve element is represented as line 5 and the value of the integrator is represented as line 6.

In time periods A and B, lines 4, 5 and 6 correspond exactly with lines 1, 2 and 3, respectively.

At the start of time period C, the integral calculated by the integrator 55 (line 6) reaches the integral threshold value. As such, a fault is noted and the desired position data which is input to the electrical signal calculator and generator 53 has a square waveform superimposed upon it, as illustrated by line 4 in time period C. The actual position of the valve element continues to differ from the desired position of the valve element throughout time period D. As such, the integrator 55 continues to produce an integral value which exceeds the integral threshold value. At the start of time period E, the number of square wave pulses reaches the allowed limit and the use of the square waveform is either terminated or another loop of the square waveform may be superimposed upon the desired position data. The fault may then be notified to the user for further investigation.

The amplitude of the square waveform may be calculated such that in the event that a "sticky" valve ceases to stick, or a "sluggish" valve ceases to be sluggish, or a "stuck" valve ceases to be stuck, then movement required of the valve element by the electrical signal will be such as to make it move only between (and not into or beyond) the open and closed stops 21, 22 of the valve 20. This is in order to prevent a valve element which suddenly becomes unstuck from hitting either of the end stops 21, 22.

That is to say, for a valve which is biased to rest at the closed stop when no electrical signal is applied, a square waveform superposition may only be carried out in the event that (a) the desired position value is greater than the amplitude of the square wave pulse and (b) the desired position value is less than the amplitude of the square wave minus the fully open position value.

An aspect of this feature may be evident from line 1 of FIG. 2a and line 4 of FIG. 2b. In particular, the maximum extent of the negative square waveform pulse is above the level of that required for the desired position to be zero (i.e. at the end stop).

As the skilled person will readily appreciate, if the pulsed waveform is a square pulsed waveform, the square pulsed waveform need not be precisely square. Indeed, the skilled person would understand that a perfect square waveform is impossible to achieve since each step change takes a finite time to take place and does not occur completely instantaneously. That is to say, the gradient of the vertical portions of the square waveform will, in practice, have a finite value rather than an infinite value. In some circumstances, it may be intentional to have a waveform which is less "square" than the most "square" waveform which would be practically achievable. It may therefore be appropriate to describe the waveform as a pulsed waveform rather than a square waveform.

In the event that the electrical signal 60 to be output by the electrical signal calculator and generator 53 is calculated as a current, then the electrical signal calculator and generator 53 may comprise a current calculator for calculating the required current and a variable current supply for supplying the current.

In the event that the electrical signal 60 to be output by the electrical signal calculator and generator 53 is calculated as a voltage then the electrical signal calculator and generator may comprise a voltage calculator for calculating the required voltage and a variable voltage supply in order to place the voltage across the DC motor 30.

Other electrical signals may fall within the scope of the invention. For example, the electrical signal might be an impedance.

In one specific embodiment, the valve may be used to control the flow of exhaust gas back to the cylinders in an exhaust gas recirculation (EGR) system of an engine. In such a case, the controller 50 may be a part of an engine control module (ECM). The valve may be biased in the closed position (such that in the default position no gas is recirculated). In a specific embodiment, the electrical actuator may be a DC motor valve which may be configured to operate with a maximum RMS (root mean square) current value of 1.1 A and with a maximum current value of 12 A. In order to remain within the maximum RMS current value, the maximum 12 A may be applied for a maximum of, for example, 120 ms.

Figure 3:
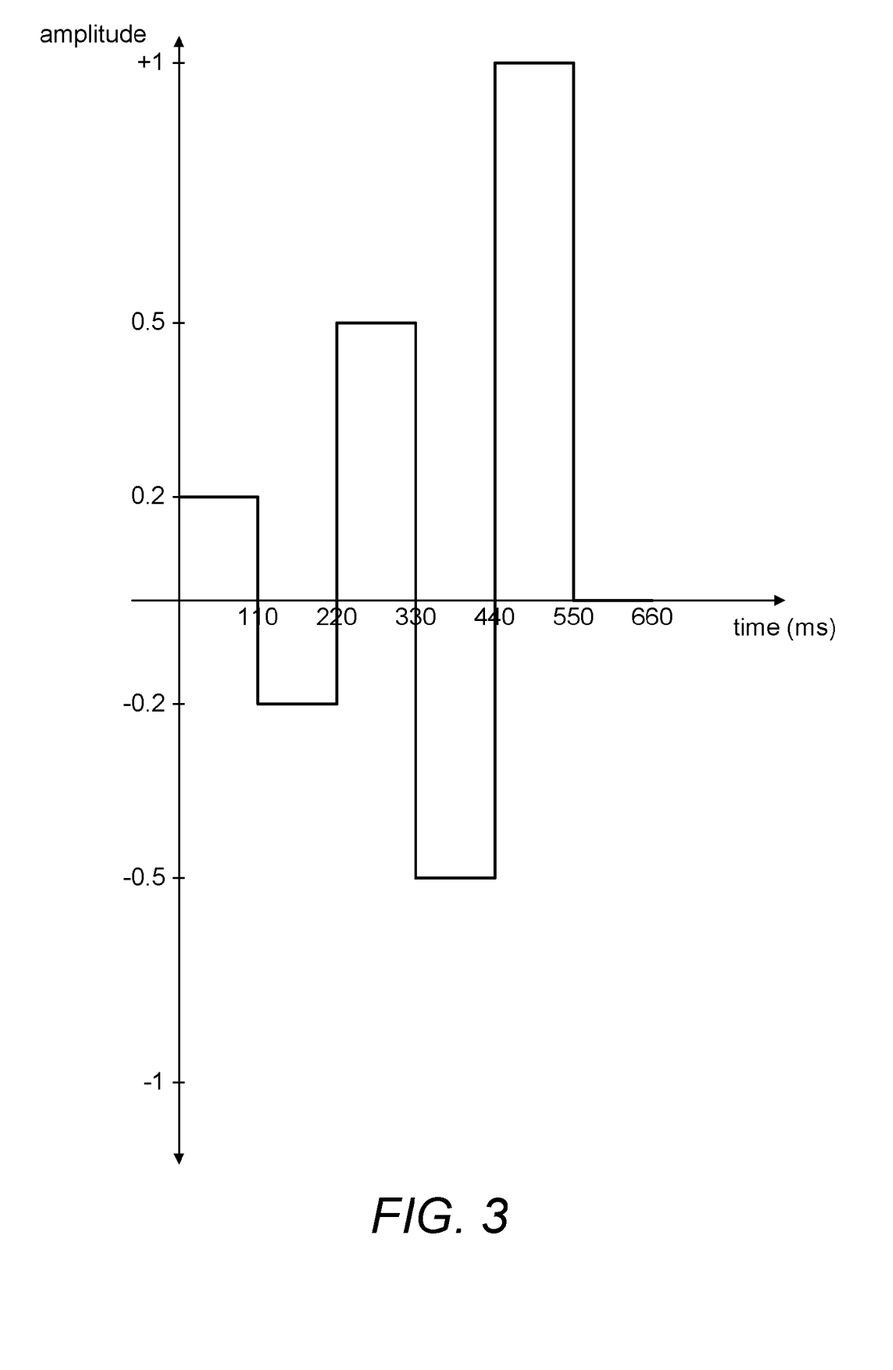
FIG. 3 is a graph showing a pulsed waveform which might be employed in the method of the disclosure.

A specific embodiment of the disclosure involves use of the square pulsed waveform illustrated in FIG. 3. This waveform comprises six components, each having a duration of 110 ms. The first component has a value of desired position +0.2, the second component has a value of desired position −0.2, the third component has a value of desired position +0.5, the fourth component has a value of desired position −0.5, the fifth component has a value of desired position +1.0, the fourth component has a value of desired position (+0.0). Since each component has a duration of 110 ms, the entire duration of this waveform is therefore 660 ms. Furthermore, the controller limits application of the waveform to six cycles (i.e. 6 times 660 ms waveforms) per key cycle, where key cycle is defined as a period initiated by engine control module (ECM) power up. In other words, if, after six applications of the waveform since ECM power up, the integrator value exceeds the integrator threshold value then no further pulsed waveforms will be superimposed over the desired valve position data. Further pulsed waveforms may, however, be applied once the ECM powers up on a next occasion.

At certain points in this disclosure, the electrical signals are referred to as being currents. The skilled person will, however, appreciate that the disclosure is not limited to currents in favour of other electrical variables. In any case, measuring, for example, a voltage by definition involves detection of the presence and/or absence and/or magnitude of a current. As such, measurement of a voltage necessarily means that a current may in turn be detected via a calculation (even if it is not directly measured). The skilled person would also appreciate that where a check requires a measured current to be below a threshold current, the check may require a measured voltage to be above a threshold voltage.

As the skilled person would readily appreciate, elements of the controller (i.e. the actual position data receiving portion 51, the desired position data receiving portion 52, the integrator 55, the pulsed waveform generator 54 and the electrical signal calculator and generator 53) might not be readily identifiable as discrete components. For example, where the controller is implemented in software, the elements may in fact be present on a single piece of hardware. In a further example, the integrator 55, pulsed waveform generator 54 and electrical signal calculator and generator 53 might be implemented as a single component. Furthermore, it may be that lines of communication between the elements are not exactly as described in the description of the specific embodiment or as illustrated in FIG. 1. The purpose of labelling the elements independently is to provide a clear explanation of their respective functions rather than to imply specific aspects of the physical implementation of the controller.

While an embodiment has been described with reference to an EGR valve in an engine, the skilled person will appreciate that the same method and apparatus may be used in respect of any other DC motor valve in an engine, such as, for example, an inlet throttle valve, a back pressure valve, or a valve which regulates flow of gas to a diesel particulate filter (DPF).

At certain points in this disclosure, the electrical actuator of the valve is described as being a DC motor. The skilled person will immediately recognise that the disclosure is not limited to a valve which is actuated by a DC motor. The disclosure may apply to any other electrically actuated valve. For example, the method of the disclosure may apply to a solenoid actuated valve.

Furthermore, the disclosure is applicable to any valve application, whether for use in an engine, in any automotive application, or in any other field.

The invention claimed is:

1. A method of controlling a valve assembly, the valve assembly including:
   a valve element movable between an open stop and a closed stop, wherein a position of the valve element between the open stop and the closed stop establishes an extent to which a valve of the valve assembly is open;
   an electrical actuator for moving the valve element in response to an electrical signal;
   a position sensor for detecting an actual position of the valve element;
   a controller configured to receive data corresponding to a desired position of the valve element and to supply a calculated electrical signal to the electrical actuator in order to effect movement of the valve element from the actual position of the valve element to the desired position of the valve element;
   the method comprising the steps of:
   calculating, by the controller, one or more electrical signals to move the valve element dependent on the actual and desired positions of the valve element;
   sending, by the controller, the one or more electrical signals to the electrical actuator;
   detecting a valve fault condition defined as the actual position of the valve element failing to match the desired position of the valve element after a configurable period has elapsed; and
   when the valve fault condition has been detected, substituting the data corresponding to the desired position of the valve element with one or more pulses of waveform data that oscillate about a value corresponding to the desired position of the valve element until either:
   the actual position of the valve element matches the desired position of the valve element to within an allowable valve position margin; or
   a preconfigured number of pulses has been reached.

2. The method of claim 1, wherein the one or more pulses of waveform data are square pulses of waveform data.

3. The method of claim 1, wherein a frequency of the one or more pulses of waveform data varies with each pulse.

4. The method of claim 1, wherein an amplitude of the one or more pulses of waveform data varies with each pulse.

5. The method of claim 4, wherein the amplitude of the one or more pulses of waveform data increases with each pulse.

6. The method of claim 1, wherein the configurable period is determined by an integrator which integrates an error between the actual position of the valve element and the desired position of the valve element since the error was last zero, wherein the configurable period is reached when the result of the integration reaches an integration threshold value.

7. The method of claim 1, wherein the number of times the method is initiated within a predetermined time period is limited.

8. The method of claim 1, wherein a modulus of the amplitude of each pulse of the one or more pulses of waveform data is less than:

a modulus of a value expected to move the valve element from the desired position of the valve element to the open stop; and a modulus of a value expected to move the valve element from the desired position of the valve element to the closed stop.

9. The method of claim 1, wherein at least one of the one or more electrical signals is a current flow.

10. The method of claim 1, wherein the electrical actuator is a DC motor.

11. The method of claim 1, wherein:
the valve assembly is an exhaust gas recirculation valve assembly; and
detecting the valve fault condition includes monitoring operation of the exhaust gas recirculation valve assembly.

12. A controller for controlling operation of a valve assembly, the valve assembly comprising:
a valve element movable between an open stop and a closed stop, wherein a position of the valve element between the open stop and the closed stop establishes an extent to which a valve of the valve assembly is open;
an electrical actuator for moving the valve element in response to an electrical signal; and
a position sensor for detecting an actual position of the valve element;
wherein the controller is configured to:
receive data corresponding to a desired position of the valve element and supply one or more calculated electrical signals to the electrical actuator in order to effect movement of the valve element from the actual position of the valve element to the desired position of the valve element;
detect a valve fault condition defined as the actual position of the valve element failing to match the desired position of the valve element after a configurable period has elapsed; and
when the valve fault condition has been detected, substitute the data corresponding to the desired position of the valve element with one or more pulses of waveform data that oscillate about a value corresponding to the desired position of the valve element until either:
the actual position of the valve element matches the desired position of the valve element to within an allowable valve position margin; or
a preconfigured number of pulses has been reached.

13. The controller of claim 12, wherein the controller includes an integrator configured to integrate an error between the actual position of the valve element and the desired position of the valve element since the error was last zero, wherein the configurable period is reached when the result of the integration reaches an integration threshold value.

14. The controller of claim 12, wherein the controller is further configured to limit a modulus of an amplitude of each pulse of the one or more pulses of waveform data such that the modulus of the amplitude of each pulse of the one or more pulses of waveform data is less than:
a modulus of a value expected to move the valve element from the desired position of the valve element to the open stop; and a modulus of a value expected to move the valve element from the desired position of valve element to the closed stop.

15. An engine control unit having a controller for controlling operation of a valve assembly, the valve assembly comprising:
a valve element movable between an open stop and a closed stop, wherein a position of the valve element between the open stop and the closed stop establishes an extent to which a valve of the valve assembly is open;
an electrical actuator for moving the valve element in response to an electrical signal; and
a position sensor for detecting an actual position of the valve element;
wherein the controller is configured to:
receive data corresponding to a desired position of the valve element and supply one or more calculated electrical signals to the electrical actuator in order to effect movement of the valve element from the actual position of the valve element to the desired position of the valve element;
detect a valve fault condition defined as the actual position of the valve element failing to match the desired position of the valve element after a configurable period has elapsed; and
when the valve fault condition has been detected, substitute the data corresponding to the desired position of the valve element with one or more pulses of waveform data that oscillate about a value corresponding to the desired position of the valve element until either:
the actual position of the valve element matches the desired position of the valve element to within an allowable valve post margin; or
a preconfigured number of pulses has been reached.

16. The method of claim 2, wherein a frequency of the one or more pulses of waveform data varies with each pulse.

17. The method of claim 16, wherein an amplitude of the one or more pulses of waveform data increases with each pulse.

18. The controller of claim 12, wherein the valve assembly is an exhaust gas recirculation valve assembly.

19. The engine control unit of claim 15, wherein the controller includes an integrator configured to integrate an error between the actual position of the valve element and the desired position of the valve element since the error was last zero, wherein the configurable period is reached when the result of the integration reaches an integration threshold value.

20. The engine control unit of claim 15, wherein the controller is further configured to limit a modulus of an amplitude of each pulse of the one or more pulses of waveform data such that the modulus of the amplitude of each pulse of the one or more pulses of waveform data is less than:
a modulus of a value expected to move the valve element from the desired position of the valve element to the open stop; and
a modulus of a value expected to move the valve element from the desired position of the valve element to the closed stop.

* * * * *